US006531560B1

United States Patent
Campbell et al.

(10) Patent No.: US 6,531,560 B1
(45) Date of Patent: Mar. 11, 2003

(54) CARBAMATE-FUNCTIONAL RESINS HAVING IMPROVED ADHESION, METHOD OF MAKING THE SAME, AND METHOD OF IMPROVING INTERCOAT ADHESION

(75) Inventors: Donald H. Campbell, Hartland, MI (US); Walter H. Ohrbom, Hartland Township, MI (US); Joseph Borst, Plymouth, MI (US); Michael A. Gessner, West Bloomfield, MI (US); Donald L. St. Aubin, Commerce Township, MI (US); Marvin L. Green, Brighton, MI (US); Bruce E. Oermann, Clinton Township, MI (US)

(73) Assignee: BASF Corporation, Southfield, MI (US)

( * ) Notice: Subject to any disclaimer, the term of this patent is extended or adjusted under 35 U.S.C. 154(b) by 199 days.

(21) Appl. No.: 09/677,063

(22) Filed: Sep. 29, 2000

Related U.S. Application Data

(60) Provisional application No. 60/157,166, filed on Sep. 30, 1999, provisional application No. 60/157,164, filed on Sep. 30, 1999, and provisional application No. 60/157,165, filed on Sep. 30, 1999.

(51) Int. Cl.⁷ .............................................. C08F 126/02
(52) U.S. Cl. ....................... 526/301; 526/266; 526/273; 526/302; 526/314; 526/320; 526/329.2
(58) Field of Search ................................ 526/266, 273, 526/301, 302, 314, 320, 329.2

(56) References Cited

U.S. PATENT DOCUMENTS

| | | | |
|---|---|---|---|
| 4,758,632 A | * 7/1988 | Parekh et al. .................. 525/383 |
| 5,356,669 A | * 10/1994 | Rehfuss et al. ............. 427/407.1 |
| 5,412,049 A | 5/1995 | Argyropoulos et al. ...... 526/312 |
| 5,593,785 A | 1/1997 | Mayo et al. .............. 428/423.1 |
| 5,866,259 A | 2/1999 | Harris et al. .............. 428/424.4 |

FOREIGN PATENT DOCUMENTS

| | | | |
|---|---|---|---|
| EP | 0 099 335 A1 | 7/1983 | .............. B22C/1/10 |
| EP | 0 594 068 A1 | 10/1993 | .......... C09D/201/02 |
| EP | 0 718 332 A2 | 12/1995 | ........... C08G/18/28 |
| EP | 0 739 963 A2 | 4/1996 | .............. C09J/4/00 |
| GB | 1 338 632 | 6/1970 | ........... B32B/27/06 |

OTHER PUBLICATIONS

Derwent Publication Ltd.., London, GB; AN 1999–224375, & JP 11 058612 A (Daito Chemitronics KK) Mar. 2, 1999.
International Search Report for PCT/US00/26905, Sep. 29, 2000, pp. 1–7.

* cited by examiner

*Primary Examiner*—Helen L. Pezzuto
(74) *Attorney, Agent, or Firm*—Mary E. Golota

(57) ABSTRACT

The invention provides carbamate-functional resins and coating compositions incorporating said resins that have improved adhesion with respect to subsequently applied films or coatings. More particularly, the invention relates to carbamate-functional addition polymers having at least 250 grams of polymer per carbamate group which are made with less than 35 percent by weight of nonfunctional monomers, preferably with less than 20 percent by weight and most preferably from 0 to less than 10 percent by weight, based on the total weight of the polymer. The invention further provides a method of making a carbamate-functional polymer and carbamate-functional polymers made by the claimed method. Finally, the invention provides a method for improving the adhesion of a first coating composition to a subsequently applied material as well as a method of making a composite comprising a coated substrate, an adhesive composition, and a glass having at least one surface.

17 Claims, No Drawings

CARBAMATE-FUNCTIONAL RESINS HAVING IMPROVED ADHESION, METHOD OF MAKING THE SAME, AND METHOD OF IMPROVING INTERCOAT ADHESION

This application claims the benefit of prior U.S. Provisional Applications Nos. 60/157,166, 60/157,164, and 60/157,165, all filed Sep. 30, 1999.

FIELD OF THE INVENTION

The invention provides carbamate-functional resins and coating compositions incorporating said resins that have improved adhesion with respect to subsequently applied films or coatings. More particularly, the invention relates to carbamate-functional addition polymers having at least 250 grams of polymer per carbamate group which are made with less than 35 percent by weight of nonfunctional monomers, preferably with less than 20 percent by weight and most preferably from 0 to 10 percent by weight, based on the total weight of the polymer. The invention further provides a method of making a carbamate-functional polymer and carbamate-functional polymers made by the claimed method. Finally, the invention provides a method for improving the adhesion of a first coating composition to a subsequently applied material as well as a method of making a composite comprising a coated substrate, an adhesive composition, and a glass having at least one surface.

BACKGROUND OF THE INVENTION

Clearcoat-basecoat composite coatings are widely used in the coatings art and are notable for desirable gloss, depth of color, distinctness of image and/or special metallic effects. Composite systems are particularly utilized by the automotive industry to achieve advantageous visual effects, especially a high degree of clarity. However, a high degree of clarity in the clearcoat makes it easier to observe defects. Defects resulting from environmental etch are particularly disadvantageous. Environmental etch is a phenomenon which manifests as spots or marks on or in the clearcoat which are removed only with loss of clearcoat.

Clearcoat compositions containing carbamate-functional acrylic polymers have been disclosed by the prior art as a solution to the problem of environmental etch.

While such polymers and compositions containing them provide a significant improvement over the prior art, improvements in some areas are still desirable. In particular, it would be advantageous to provide polymers exhibiting improved adhesion while still possessing the positive environmental etch and performance characteristics of carbamate-functional acrylics. Improvements are particularly desired with respect to adhesion of the polymer-containing composition to one or more subsequently applied coatings or materials.

For example, surfaces coated with clearcoat-basecoat compositions must sometimes be repaired or treated to correct minor defects or flaws. Such repairs often require the application of subsequently applied basecoat/clearcoat composite compositions, basecoat or clearcoat compositions alone, or fast cure versions thereof. That portion of the originally applied clearcoat composition must adhere to the subsequently applied basecoat/clearcoat composite composition, basecoat or clearcoat compositions alone, and/ or any other subsequently applied material or materials. Adhesion failures resulting from a weak bond between the originally applied coating and the subsequently applied coating or material are known as intercoat adhesion failures. Intercoat adhesion is thus a required characteristic of coating compositions intended for use in clearcoat-basecoat compositions, especially for clearcoat compositions intended for use in the automotive OEM markets.

While carbamate-functional polymers and compositions incorporating the same have been disclosed in the prior art to have advantageous properties, intercoat and repair adhesion issues remain unaddressed.

For example, U.S. Pat. No. 5,412,049 discloses copolymers which are the copolymerization product of (a) hydroxyl (meth)acrylate ester monomers and (b) (meth) acrylate esters of hydroxyalkyl carbamate monomers. Other comonomers based on (meth)acrylate homopolymers or copolymers and optional ethylenically unsaturated monomers may be copolymerized with the functional components (a) and (b) in amounts of from about 0 to 90 weight percent of the total copolymer composition, more preferably from 10 to 80 weight percent of the total copolymer composition, most preferably from about 20 to 70 weight percent of the total copolymer composition.

However, adhesion, especially intercoat adhesion, is not discussed in the '049 patent. Moreover, all of the working examples require the use of 55 weight percent or more of nonfunctional ethylenically unsaturated monomers.

U.S. Pat. No. 5,356,669 provides a curable coating composition comprising (a) a first component comprising a polymer backbone having appended thereto at least one carbamate-functional group, and (b) a second component comprising a compound having a plurality of functional groups that are reactive with said carbamate group. The polymer component (a) is represented by the formula

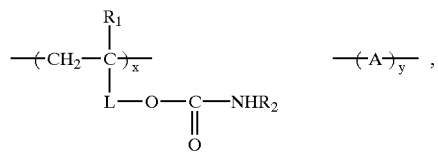

In this formula, A represents repeat units derived from one or more ethylenically unsaturated monomers such as alkyl esters of acrylic or methacrylic acid, e.g., ethyl acrylate, butyl acrylate, 2-ethylhexyl acrylate, butyl methacrylate, isodecyl methacrylate, hydroxyethyl methacrylate, hydroxypropyl acrylate, and the like; and vinyl monomers such as unsaturated m-tetramethyl vinyl isocyanate, styrene, vinyl toluene and the like, x and y represent weight percentages, with x being 10 to 90% and preferably 40 to 60%, and y being 90 to 10% and preferably 60 to 40%.

Thus, the prior art has failed to achieve a carbamate functional polymer having the desired adhesion to subsequently applied materials.

Accordingly, it is an object of the invention to provide carbamate-functional polymers that exhibit improved adhesion to subsequently applied materials while maintaining the known advantages of carbamate-functional polymers.

It is a further object of the invention to provide coating compositions containing such carbamate-functional polymers.

It is another object of the invention to provide a method of making a carbamate-functional polymer having improved intercoat adhesion properties as well as carbamate-functional polymers made from such a method.

These and other objects of the invention have been achieved by the instant invention.

It has unexpectedly been found that use of less than 35 percent by weight of nonfunctional monomers based on the total weight of the polymer, preferably less than 20 percent and most preferably less than 10 percent, results in desirable improvements in adhesion, especially recoat adhesion. Even more unexpectedly, it has been found that such improvements in adhesion can be obtained without the loss of any of the desirable performance, reactivity and/or application characteristics associated with carbamate-functional acrylics.

SUMMARY OF THE INVENTION

The invention provides a carbamate-functional polymer having a backbone made by addition polymerization. The polymer has an equivalent weight of at least 250 grams of polymer per carbamate group and comprises from at least 66 to 100% by weight, based on the total weight of the polymer, of one or more repeat units A selected from the group consisting of

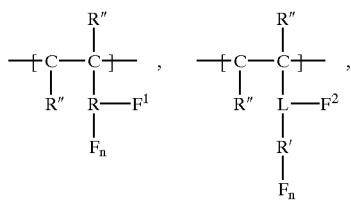

and mixtures thereo, and
and from 0 to less than 35% by weight, based on the total weight of the polymer, of one or more repeat units A' having the structure

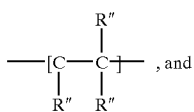

wherein R is an at least divalent nonfunctional linking group having from 1 to 60 carbons atoms and from 0 to 20 heteroatoms selected from the group consisting of oxygen, nitrogen, sulfur, phosphorus, silane, and mixtures thereof, R' is an at least monovalent nonfunctional linking group having from 1 to 60 carbon atoms and from 0 to 20 heteroatoms selected from the group consisting of oxygen, nitrogen, sulfur, phosphorus, silane, and mixtures thereof, the at least monovalent nonfunctional linking group preferably having at least one branched alkyl group of at least 5 carbons, R" is H or a monovalent nonfunctional linking group having from 1 to 60 carbon atoms and from 0 to 20 heteroatoms selected from the group consisting of oxygen, nitrogen, sulfur, phosphorus, and silane, and mixtures thereof, L is a divalent nonfunctional linking group having from 1 to 60 carbon atoms and from 0 to 20 heteroatoms selected from the group consisting of oxygen, nitrogen, sulfur, phosphorus, silane, and mixtures thereof, F, $F^1$ and $F^2$ are functional groups selected from the group consisting of pendant carbamate groups, especially primary carbamate groups, hydroxyl groups, and mixtures thereof, with the proviso that at least one of $F^1$ and $F^2$ are a primary carbamate group or a beta-hydroxy primary carbamate group, and n is an integer from 0 to 3.

The invention also provides a method of making a carbamate-functional polymer having an equivalent weight of at least 250 grams of polymer per carbamate group.

The method requires the preparation of a backbone polymer comprising one or more functional groups F'. The backbone polymer is prepared by the addition polymerization of from at least 66 to 100% by weight, based on the total weight of the carbamate-functional polymer, of one or more ethylenically unsaturated carbamate free monomers A having at least one functional group F', and from 0 to less than 35% by weight, based on the total weight of the carbamate-functional polymer, of one or more nonfunctional ethylenically unsaturated monomers A'.

The resulting backbone polymer is then reacted with one or more compounds B to make a carbamate-functional polymer having at least one carbamate group. The one or more compounds B have at least one functional group (b1), which, upon reaction with either a functional group F' or the reaction product of one or more prior reactions of a functional group (b1) and functional group F', results in a carbamate group.

Finally, the invention provides methods of improving the adhesion of a first coating composition to a subsequently applied material.

The method requires the use of a first coating composition comprising a polymer having a backbone resulting from addition polymerization and having from 0 to less than 35 weight percent of repeat units from nonfunctional ethylenically unsaturated monomers A', based on the total weight of the carbamate-functional polymer.

In another aspect of the invention, a method of making a particular composite is provided. The composite comprises a coated substrate, an adhesive composition, and a glass having at least one surface. To make the coated substrate, the method requires the use of a coating composition comprising a polymer having a backbone resulting from addition polymerization and from 0 to less than 35 weight percent of repeat units from nonfunctional ethylenically unsaturated monomers A', based on the total weight of the carbamate-functional polymer. After the coated substrate is prepared, an adhesive composition is applied to the coated substrate, and a glass having at least one surface is adhered to the adhesive composition to form a composite wherein the at least one surface of the glass is adhered to the coated substrate by the adhesive composition. It has been found that the strength of the adhesive bond between the at least one surface of the glass and the coated substrate is greater than the strength of an adhesive bond in a second composite wherein a second substrate is coated with a second coating composition comprising a polymer having a backbone resulting from addition polymerization and at least 35 weight percent or more of repeat units from nonfictional ethylenically unsaturated monomers A', based on the total weight of the polymer.

DETAILED DESCRIPTION OF THE PREFERRED EMBODIMENTS

It has unexpectedly been found that carbamate-functional polymers made with from 0 to less than 35 weight percent of nonfunctional ethylenically unsaturated monomers, based on the total weight of the carbamate-functional polymer, and coating compositions containing such polymers, possess advantageous intercoat or repair adhesion properties. The terms "intercoat adhesion" or "repair adhesion" as used herein refer to the adhesion of a composition, especially a first coating composition, to a subsequently applied material, especially a subsequently applied second coating composition. Carbamate-functional as used herein refers to pendant or terminal carbamate groups, most preferably primary carbamate groups.

The carbamate-functional polymers of the invention require a structure having a polymer backbone made via the polymerization of ethylenically unsaturated monomers and as such will consist substantially of carbon-carbon linkages. Although the carbamate-functional polymers of the invention may be made by addition polymerization, it is preferred that the carbamate-functional polymer of the invention not be a true or simple addition polymer, i.e., the polymer may have atoms and functional groups other than those present in the monomers polymerized to provide the polymer backbone.

Thus, in its broadest sense, the polymers of the invention may be made by polymerization of one or more ethylenically unsaturated monomers, wherein at least 66 weight percent or more of the total weight of polymerized monomers contain at least one carbamate-functional group or a group convertible to a carbamate group.

One or more acrylic monomers having a carbamate-functional group in the ester portion of the monomer may be used. Such monomers are well known in the art and are described, for example in U.S. Pat. Nos. 3,479,328, 3,674, 838, 4,126,747, 4,279,833, and 4,340,497, the disclosures of which are incorporated herein by reference. One method of synthesis involves reaction of a hydroxy ester with urea to form the carbamyloxy carboxylate (i.e., carbamate-modified acrylic). Another method of synthesis reacts an α,β-unsaturated acid ester with a hydroxy carbamate ester to form the carbamyloxy carboxylate. Yet another technique involves formation of a hydroxyalkyl carbamate by reacting ammonia, a primary or secondary amine or diamine with a cyclic carbonate such as ethylene carbonate. The hydroxyl group on the hydroxyalkyl carbamate is then esterified by reaction with acrylic or methacrylic acid to form the monomer. Other methods of preparing carbamate-modified acrylic monomers are described in the art, and can be utilized as well.

The acrylic monomer having a carbamate functional group can then be polymerized along with other ethylenically unsaturated monomers that may or may not have functional groups, if desired, by techniques well known in the art. However, the amount of nonfunctional ethylenically unsaturated monomer must be from 0 to less than 35 weight percent, based on the total weight of the polymer. Preferably, the amount of ethylenically unsaturated monomers having no functional groups will be from 0 to 20 percent and most preferably will be from 0 to less than 10 percent by weight, based on the total weight of the polymer. As used herein, the terms "nonfictional ethylenically unsaturated monomers" or "ethylenically unsaturated monomers having no functional groups" refer to ethylenically unsaturated monomers which do not contain functional groups which are reactive with crosslinking agents, especially aminoplast and/or isocyanate functional crosslinking agents. Examples of such reactive functional groups are pendant carbamate groups, both secondary and primary, and hydroxyl groups.

At a minimum, from 0 to less than 35 weight percent, preferably from 0 to less than 20 percent, and most preferably from 0 to 10 or less than 10 percent by weight, of ethylenically unsaturated monomers which are substantially free of carbamate groups, especially primary carbamate groups, and hydroxyl groups will be used, based on the total weight of the polymer.

Examples of nonfunctional ethylenically unsaturated monomers that may be used are the alkyl esters of acrylic acid, methacrylic acid and/or crotonic acid such as methyl, ethyl, propyl, butyl, pentyl, hexyl, octyl, decyl, and dodecyl acrylates and methacrylates. Other examples include styrene, vinyl cyclohexane, vinyl cyclooctane, vinyl cyclohexene, hexanediol diacrylate, vinyl naphthalene, alpha methylstyrene, and the like.

An alternative route for preparing the carbamate functional polymer of the invention is to react an already-formed acrylic backbone polymer with another component to form a carbamate-functional group appended to the polymer backbone, as described in U.S. Pat. No. 4,758,632, the disclosure of which is incorporated herein by reference. One technique for preparing a carbamate functional polymer involves thermally decomposing urea (to give off ammonia and HNCO) in the presence of a hydroxy-functional acrylic polymer to form a carbamate-functional acrylic polymer. Another technique involves reacting the hydroxyl group of a hydroxyalkyl carbamate with the isocyanate group of an isocyanate-functional acrylic or vinyl monomer to form the carbamate-functional acrylic. Isocyanate-functional acrylics are known in the art and are described, for example in U.S. Pat. No. 4,301,257, the disclosure of which is incorporated herein by reference. Isocyanate vinyl monomers are well known in the art and include unsaturated m-tetramethyl xylene isocyanate (sold by American Cyanamid under the trademark TMI®). Yet another technique is to react the cyclic carbonate group on a cyclic carbonate-functional acrylic with ammonia in order to form the carbamate-functional acrylic. Cyclic carbonate-functional acrylic polymers are known in the art and are described, for example, in U.S. Pat. No. 2,979,514, the disclosure of which is incorporated herein by reference. Another way is to react a hydroxyalkyl carbamate with an anahydride backbone. Alternatively, a carboxy carbamate may be reacted with an epoxy acrylic. In fact any condensation reaction or combination thereof may used to carbamate or post extend the polymer backbone. A more difficult, but feasible way of preparing the polymer would be to trans-esterify an acrylate polymer with a hydroxyalkyl carbamate.

Most preferably, the carbamate-functional polymers of the invention will be made by a two stage reaction wherein a backbone polymer is made by polymerizing from at least 66 to 100% by weight of one or more ethylenically unsaturated carbamate free monomers A having at least one functional group F' and from 0 to less than 35% by weight of one or more nonfunctional ethylenically unsaturated monomers A', based on the total weight of the final polymer. The backbone polymer is then reacted with one or more compounds B so as to produce a carbamate-functional polymer having at least one carbamate group, preferably a primary carbamate group. The one or more compounds B have at least one fictional group (b1), which upon reaction with either a functional group F' or the reaction product of one or more prior reactions of a functional group (b1) and functional group F', results in a carbamate group, preferably a primary carbamate group, being appended to the backbone polymer.

Preferably from 80 to 100 percent by weight of monomers A will be used, and most preferably from 90 percent or more, based on the total weight of the final polymer.

Monomers within the scope of ethylenically unsaturated carbamate free monomers A having at least one functional group F' are those which do not have any secondary or primary carbamate groups. Functional group F' may be any functional group or moiety which upon reaction with a functional group (b1) or the prior reaction product thereof, results in a carbamate group. Functional group F' may thus be any functional group convertible to a carbamate group. Examples of functional groups F' include carboxylic acid, hydroxy, cylic carbonate groups, isocyanate groups, epoxy, silane, anhydrides and mixtures thereof. Preferably functional group F' will be an epoxy group, a carboxylic acid, or a hydroxy group and mixtures thereof, most preferably, functional group F' will be a carboxylic acid group, or a hydroxy group.

Examples of suitable monomers A are methacrylic acid, acrylic acid, hydroxy alkyl esters of methacrylic acid and/or acrylic acid such as hydroxy ethyl (meth)acrylate, hydroxy propyl (meth)acrylate, and the like, vinyl monomers such unsaturated m-tetramethyl vinyl isocyanate (sold by American Cyanamide under the trademark TMI®), glycidyl methacrylate, maleic anhydrides, isocyanate ethyl(methyl) acrylate, mixture thereof, and the like. Preferred monomers A are (meth)acrylic acid, hydroxy alkyl esters of (meth) acrylic acid and mixtures thereof. Most preferred for use as monomers A are acrylic acid, methacrylic acid, hydroxy-ethyl methacrylate and mixtures thereof.

Monomers suitable for use as one or more nonfunctional ethylenically unsaturated monomers A' are those described above with respect to the nonfunctional ethylenically unsaturated monomers which maybe copolymerized with the carbamate functional acrylic monomers. Preferred nonfunctional ethylenically unsaturated monomers A' are the alkyl esters of acrylic acid, methacrylic acid, styrene and mixtures thereof. Suitable alkyl esters are those having from 1 to 20 carbons, preferably from 1 to 10 carbons, and most preferably from 2 to 6 carbons.

The amount of one or more nonfunctional ethylenically unsaturated monomers A' used must be from 0 to less than 35 weight percent, based on the total weight of the final polymer. Final polymer as used herein refers to the carbamate-functional polymer obtained after the reaction of the backbone polymer and one or more compounds B. Preferably, the amount of ethylenically unsaturated monomers A' having no functional groups will be from 0 to 20 percent and most preferably will be from 0 to less than 18 percent by weight, based on the total weight of the polymer. However, amounts of from 1 to less than 10 percent, especially 8 or percent or less are also acceptable.

At a minimum, from 0 to less than 35 weight percent, preferably from 0 to less than 20 percent of ethylenically unsaturated monomers A' which are substantially free of pendant carbamate groups, especially primary carbamate groups and hydroxyl groups will be used, based on the total weight of the final polymer.

Monomers A and A' may be copolymerized by a variety of polymerization techniques. Illustrative examples include solution polymerization, aqueous emulsion, dispersion, or suspension polymerization, bulk polymerization, nonaqueous emulsion, dispersion, or suspension polymerization, and the like. Polymerization may occur in a variety of reactor types, i.e., stirred batch reactors, tubular reactors, and the like, all of which may be made of materials known to those skilled in the art.

In a preferred embodiment, the addition polymerization will take place in an aromatic solvent blend having a significant portion of co-solvents having a polar nature. As used herein, polar is defined as having a dielectric constant of at least 15 (25° C.), preferably from 12–25 (25° C.), and most preferably from 18 to 22 (25° C.). However, such suitable co-solvents may not have any functionality which will interfere or preclude subsequent secondary reactions between the backbone polymer and one or more compounds B. Examples of suitable polar co-solvents which are not suitable for use herein are alcohols, esters, ketones, ethers, and the like. Rather, preferred co-solvents are those having a functionality which will react with the backbone polymer. Ideally, the co-solvents will be capable of functioning as a compound B in reactions with the backbone polymer. As discussed below, such reactions may occur during and/or after the polymerization of monomers A and A'. Examples of preferred co-solvents are those having monofunctional epoxy groups or carbamate functionality 'such as methyl carbamate, glycidyl neodecanoate, and mixtures thereof.

The copolymerization of monomers A and A' results in a backbone polymer having one or more functional groups F'.

The copolymerization product of monomers A and A' will be reacted with one or more compounds B. Compound B may generally be any compound having a functional group b1 reactive with functional group F' or the reaction product of an earlier reaction between group F' and a functional group b1. Compound B may comprise a further functional group b2 selected from the group consisting of carbamate groups and groups convertible to carbamate groups. At least one of the compounds B will react with the backbone polymer to provide a reaction product containing a carbamate group or a group convertible to a carbamate group. For example, if compound B contains both b1 and b2, wherein b2 is a primary carbamate group, reaction of functional group F' with functional group b1 will result in a reaction product containing a primary carbamate group appended to the backbone polymer. It will be appreciated that the reaction of other compounds B with the backbone polymer may result in noncarbamate group containing reaction products.

Examples of functional groups b1 and b2 include carbamate, glycidyl, hydroxy, isocyanate, cyclic carbonates, phosgene, triphosgene, $NH_3$, amines, carboxylic acids, anhydrides, epoxy, mixtures thereof, and the like.

Illustrative examples of compound B include beta-hydroxy carbamates such as hydroxy propyl carbamate, e-caprolactone, alkyl carbamates, glycidyl compounds such as glycidyl neodecanoate and the like, anhydrides such as succinic anhydride, acid carbamates, amino carbamates, and mixtures thereof. Preferred examples are methyl carbamate, glycidyl neodecanoate, and mixtures thereof.

Illustrative examples of the reaction product of monomers A and A' with one or more compounds B are provided as follows.

An acid functional backbone polymer may be reacted with an epoxy functional compound B. The resultant hydroxy may be reacted with a further compounds B such as e-caprolactone, octanoic acid or transcarbamated.

An isocyanate or acid functional backbone polymer may be reacted with a beta hydroxy carbamate such as hydroxy propyl carbamate.

An epoxy functional backbone may be made by either homopolymerizing glycidyl methacrylate or copolymerizing glycidyl methacrylate with low levels of nonfunctional monomers, i.e., less than 35%, preferably from 1 to 10, and most preferably less than 9%, based on the total weight of the final resulting carbamate functional polymer. The homopolymer or copolymer is then made carbamate functional via reaction of the epoxy groups with a carboxylic acid functional and primary carbamate containing compound. An illustrative acid carbamate is the reaction product of succinic anhydride and hydroxy propyl carbamate.

The reaction of the backbone polymer and the one or more compounds B may take place before, during or after polymerization of the ethyenically unsaturated monomers A and A'.

The carbamate-functional polymers of the invention will generally have a number average molecular weight of from 800 to 50,000, more preferably from 1000 to 5000, and most preferably from 1,500 to 3000. Molecular weight can be determined by the GPC method using a polystyrene standard.

The carbamate content of the polymer, on a molecular weight equivalent of carbamate functionality, will be at least 250 grams of polymer per carbamate group, more preferably between 300 and 600, and most preferably from 350 to 500. Equivalent weight as used herein refers only to primary carbamates and does not include any secondary carbamates within the scope of R, R' or R".

The glass transition temperature, $T_g$ should be between $-100°$ C. and $+200°$ C., more preferably between 0 and 150, and most preferably from 25 to $100°$ C.

A preferred carbamate functional polymer of the invention will have a number average molecular weight of from 1000 to 5000, a carbamate equivalent weight of from 300 to 600, and a Tg of from 0 to $150°$ C. A most preferred carbamate-functional polymer of the invention will have a number average molecular weight of from 1500 to 3000, a carbamate equivalent weight of from 350 to 500, and a Tg of from 25 to $100°$ C.

The carbamate functional polymer of the invention will have from at least 66 to 100% by weight, based on the total weight of the polymer, of one or more repeat units A selected from the group consisting of

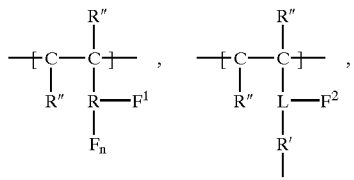

and mixtures thereof, and
from 0 to less than 35% by weight, based on the total weight of the polymer, of one or more repeat units A' having the structure

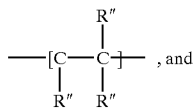, and

More preferably, the carbamate functional polymer of the invention will have from 80 to 100 weight percent of one or more repeat units A and from 20 to 0 weight percent of one or more repeat units A', and most preferably, from 90 to 100 weight percent of one or more repeat units A and from 10 to 0 weight percent of one or more repeat units A', based on the total weight of the final carbamate functional polymer. A particularly preferred carbamate functional polymer of the invention will have more than 90 weight percent of one or more repeat units A and less than 10 weight percent, preferably between 1 and 9 weight percent, of one or more repeat units A', based on the total weight of the carbamate functional polymer of the invention.

In the above, R is an at least divalent nonfunctional linking group having from 1 to 60 carbon atoms and from 0 to 20 heteroatoms selected from the group consisting of oxygen, nitrogen, sulfur, phosphorus, and silane, and mixtures thereof As used here, "nonfunctional" refers to the absence of groups which are reactive with crosslinking agents under traditional coating curing conditions.

Illustrative examples of suitable R groups are aliphatic or cycloaliphatic linking groups of from 1 to 60 carbons, aromatic linking groups of from 1 to 10 carbons, and mixtures thereof Preferred R groups include aliphatic or cycloaliphatic groups of from 2 to 10 carbons. R may, and preferably will, include one or more heteroatoms via one or more divalent internal linking groups such as esters, amides, secondary carbamates, ethers, secondary ureas, ketones, and mixtures thereof. Internal linking groups selected from the group consisting of esters, secondary carbamates, and mixtures thereof, are more preferred, with esters being most preferred.

Examples of particularly preferred R groups are set forth below. Note that $F^1$ is not part of R but is shown in the structures below to provide perspective.

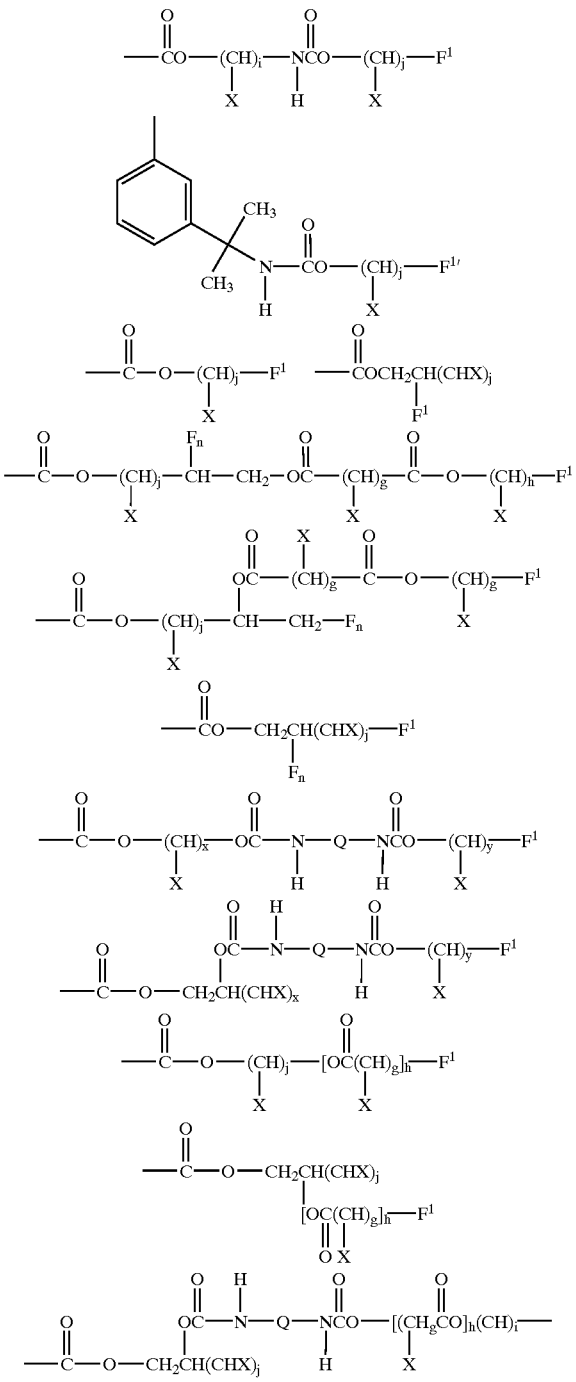

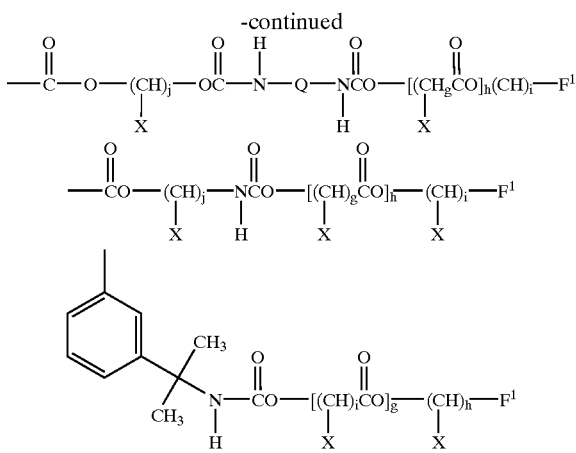

and isomers thereof, wherein X is H or is a a monovalent nonfictional linking group having from 1 to 20 carbon atoms and from 0 to 20 heteroatoms selected from the group consisting of oxygen, nitrogen, sulfur, phosphorus, and silane, and mixtures thereof; i, j, g, and h are intergers from 0 to 8; and Q is an at least divalent nonfunctional linking group having from 1 to 60 carbon atoms and from 0 to 20 heteroatoms selected from the group consisting of oxygen, nitrogen, sulfur, phosphorus, and silane, and mixtures thereof.

A most preferred R group is

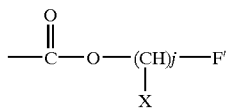

wherein j is from 1 to 6 and X is as defined above.

R' is an at least monovalent nonfunctional linking group having from 1 to 60 carbon atoms and from 0 to 20 heteroatoms selected from the group consisting of oxygen, nitrogen, sulfur, phosphorus, and silane, and mixtures thereof. As used here, "nonfictional" refers to the absence of groups which are reactive with crosslinking agents under traditional coating curing conditions.

Illustrative examples of suitable R' groups are aliphatic or cycloaliphatic linking groups of from 1 to 60 carbons, aromatic linking groups of from 1 to 10 carbons, and mixtures thereof. Preferred R' groups include aliphatic or cycloaliphatic groups of from 2 to 10 carbons. R' may, and preferably will, include one or more heteroatoms via one or more divalent internal linking groups such as esters, amides, secondary carbamates, ethers, secondary ureas, ketones, and mixtures thereof The use of esters as internal linking groups is most preferred.

Examples of particularly preferred R' groups are

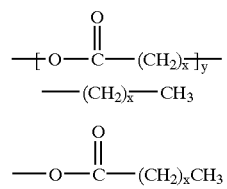

wherein x and y are from 0 to 10, preferably from 3 to 8.

In a preferred embodiment, the at least monovalent nonfunctional linking group R' will comprise at least one branched alkyl group of from 5 to 20 carbons, preferably from 5 to 15 carbons and most preferably from 8 to 12 carbons. An example of an especially suitable structure for incorporation into linking group R' is

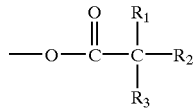

wherein $R_1$, $R_2$, and $R_3$ are alkyl groups of from 1 to 10 carbons each. Most preferably, $R_1$, $R_2$, and $R_3$ will total from 8 to 12 carbons with at least one of $R_1$, $R_2$, and $R_3$ being a methyl group. In a most preferred emodiment, n will be 0 when R' comprises this branched alkyl structure.

R" is H or a monovalent nonfunctional linking group having from 1 to 20 carbon atoms and from 0 to 20 heteroatoms selected from the group consisting of oxygen, nitrogen, sulfur, phosphorus, and silane, and mixtures thereof Illustrative examples of suitable R" groups are hydrogen, aliphatic or cycloaliphatic linking groups of from 1 to 60 carbons, aromatic linking groups of from 1 to 10 carbons, and mixtures thereof. R" may, and preferably will, include one or more heteroatoms via one or more divalent internal linking groups such as esters, amides, secondary carbamates, ethers, secondary ureas, ketones, and mixtures thereof.

Preferred R" groups are H, -$CH_3$, aromatic groups such as benzyl, and alkyl esters of from 2 to 10 carbons, especially from 4 to 8 carbons. H and methyl are most preferred as R".

L is an at least trivalent nonfunctional linking group having from 1 to 60 carbon atoms and from 0 to 20 heteroatoms selected from the group consisting of oxygen, nitrogen, sulfur, phosphorus, and silane, and mixtures thereof. As used here, "nonfunctional" refers to the absence of groups which are reactive with crosslinking agents under traditional coating curing conditions.

Illustrative examples of suitable L groups are aliphatic or cycloaliphatic linking groups of from 1 to 60 carbons, aromatic linking groups of from 1 to 10 carbons, and mixtures thereof Preferred L groups include aliphatic or cycloaliphatic groups of from 2 to 10 carbons. L may, and preferably will, include one or more heteroatoms via one or more divalent internal linking groups such as esters, arnides, secondary carbamates, ethers, secondary ureas, ketones, and mixtures thereof Internal linking groups selected from the group consisting of esters, secondary carbamates, and mixtures thereof, are more preferred, with esters being most preferred.

An example of preferred L groups are

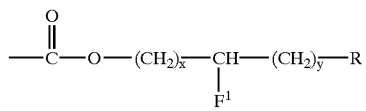

and isomers thereof, wherein $F^1$ and R are as described, x and y may the same or different and are from 0 to 10, preferably from 1 to 3, and is most preferably 1.

F, $F^1$ and $F^2$ are functional groups selected from the group consisting of primary carbamate groups, hydroxyl groups, and mixtures thereof, such as beta-hydroxy primary carbamate groups, with the proviso that at least one of $F^1$ and $F^2$ are a primary carbamate group or a beta-hydroxy primary carbamate group, and n is an integer from 0 to 3, most preferably 0.

The carbamate functional polymer of the invention may be used in variety of ways but will most preferably be utilized in a coating composition as a principal film forming component (a). Illustrative coating compositions within the scope of the instant invention include but are not limited to primer compositions, basecoat compositions, clearcoat compositions and/or variations thereof.

The coating compositions of the invention provide a variety of unexpected benefits. For example, as indicated below in the working examples, coating compositions of the invention demonstrate improved intercoat or repair adhesion as well as improved scratch and mar resistance. In addition, the coating compositions of the invention demonstrate significant adhesion to primerless polyurethane adhesives such as are used in the calking and sealing of automotive windshield composites.

In general coatings compositions of the invention may be cured by a reaction of the carbamate-functional polymer component (a) with one or more crosslinking components (b). At least one of component (b) must have a plurality of functional groups which are reactive with the carbamate groups on component (a). Such required reactive groups include active methylol or methylalkoxy groups on aminoplast crosslinking agents or on other compounds such as phenol/formaldehyde adducts, siloxane groups, anhydride groups and mixtures thereof. In addition, other reactive groups may be used which are reactive with the noncarbamate-functional groups of the carbamate-functional polymer component (a), i.e, hydroxyl groups. Examples of such other suitable reactive groups for use in component (b) are isocyanate, epoxy, carboxylic, siloxane, activated esters, anhydride, and mixtures thereof If both types of reactive groups are utilized, such groups may be found on the same or different components (b). Illustrative examples of (b) compounds incorporating such required reactive groups include melaamine formaldehyde resin (including monomeric or polymeric melamine resin and partially or fully alkylated melamine resin), urea resins (e.g., methylol ureas such as urea formaldehyde resin, alkoxy ureas such as butylated urea formaldehyde resin), polyanhydrides (e.g., polysuccinic anhydride), polysiloxanes (e.g., trimethoxy siloxane), isocyanate functional resins, functional acrylics such as acid, isocyanate, and/or aminoplast functional acrylics, and mixtures thereof. Aminoplast resin such as melamine formaldehyde resin or urea formaldehyde resin are especially preferred. Most preferred for use as one or more components (b) are mixtures of crosslinking agent such as aminoplast resins and isocyanate functional resins.

It will be further appreciated that coating compositions of the invention may further comprise, in addition to the carbamate-functional polymer component (a) of the invention and one or more crosslinking components (b), additional film-forming components such as polyurethanes, polyesters, acrylics, polyethers, and mixtures thereof.

A solvent may optionally be utilized in the coating compositions of the present invention. Although the composition used according to the present invention may be utilized, for example, in the form of substantially solid powder, or a dispersion, it is often desirable that the composition is in a substantially liquid state, which can be accomplished with the use of a solvent. This solvent should act as a solvent with respect to both the carbamate-functional polymer (a) as well as the component (b). In general, depending on the solubility characteristics of components (a) and (b), the solvent can be any organic solvent and/or water. In one preferred embodiment, the solvent is a polar organic solvent. More preferably, the solvent is a polar aliphatic solvents or polar aromatic solvents. Still more preferably, the solvent is a ketone, ester, acetate, aprotic amide, aprotic sulfoxide, or aprotic amine. Examples of useful solvents include methyl ethyl ketone, methyl isobutyl ketone, m-amyl acetate, ethylene glycol butyl ether-acetate, propylene glycol monomethyl ether acetate, xylene, N-methylpyrrolidone, or blends of aromatic hydrocarbons. In another preferred embodiment, the solvent is water or a mixture of water with small amounts of aqueous co-solvents.

The coating compositions of the invention may include a catalyst to enhance the cure reaction. For example, when aminoplast compounds, especially monomeric melamines, are used as component (b), a strong acid catalyst may be utilized to enhance the cure reaction. Such catalysts are well-known in the art and include, for example, p-toluenesulfonic acid, dinonylnaphthalene disulfonic acid, dodecylbenzenesulfonic acid, phenyl acid phosphate, monobutyl maleate, butyl phosphate, and hydroxy phosphate ester. Other catalysts that may be useful in the composition of the invention include Lewis acids, zinc salts, and tin salts.

In a preferred embodiment of the invention, the solvent is present in the coating compositions of the invention in an amount of from about 0.01 weight percent to about 99 weight percent, preferably from about 10 weight percent to about 60 weight percent, and more preferably from about 30 weight percent to about 50 weight percent, based on the total weight of the coating composition.

The coating compositions of the invention may further comprise additional additives and components such as leveling agents, flow modifers, adhesion modifiers, UV absorbers, HALS compounds, antioxidants, wetting agents, and the like. However, it has been found that the use of certain additives with the carbamate functional polymer of the invention provide unexpected advantages over other additives.

For example, it has unexpectedly been found that many traditional flow and/or leveling agents do not provide adequate performance when combined with the carbamate functional polymer of the invention. In fact, many show negative effects. For example, it has been found that many leveling and flow agents negatively affect the repairability of the coating composition, particularly with waterborne coating compositions such as waterborne basecoat compositions. This ability to be recoated or 'wet out' by subsequently applied coating compositions is necessary for automotive coating compositions. Finally, such traditional flow, leveling and/or wetting agents must not negatively affect the pop resistance of the coating compositions. "Pop" is generally referred to as holes or blemishes in the finished film which are believed to be due to the exiting of volatile substances from the at least partially cured film.

It has now been found that certain preferred flow agents provide the desired leveling, flow and recoatability properties when used with the carbamate functional polymers of the invention. Such preferred flow additives can generally be described as falling within one of four particular types of flow agents. Polyvinyl acrylic copolymers, hydroxyl functional polyether polysiloxanes, halogenated polysiloxanes and mixtures thereof, have been found to be suitable for use in the instant invention, with hydroxyl functional polyether polysiloxanes being most preferred. Illustrative commercially available examples of these types of preferred flow additives are Byk 373 (hydroxyl polyether polydimethyl polysiloxane) commercially available from Byk Chemie, Disparlon™ LC955 (vinyl acrylate copolymer) commercially available from Kyoeisha Chemical, Silwet™ L-7614 (hydroxyl functional polyether modified polysiloxane) commercially available from Witco Chemical, and Addid™ 761 (fluorinated polysiloxane) commercially available from Wacker Chemical. Silwet™ L-7614 is a most preferred flow additive for use in the instant coating compositions.

Such preferred flow additives will generally be used in the coating compositions of the invention in amounts of from 0.03 to 2.0%, based on total resin solids, with ranges of from 0.1 to 0.8% being preferred, and ranges of from 0.3 to 0.5% being most preferred, all being based on total resin solids.

In another aspect of the invention, it has been found that only certain preferred hindered amine light stabilizers, hereafter referred to as HALS compounds, provide desireable results when combined with the carbamate functional polymers of the invention. For example, it has been found that many traditional HALS agents are incompatible with the polar carbamate polymers of the invention. It has now been found that HALS having a molecular weight of at least less than 300, most preferable less than 260 provide desirable performance properties when combined with the carbamate functional polymer of the invention. Such incompatible HALS extrude from the finished film and fail to provide the desired long term durability performance characteristics.

Illustrative commercially available examples of suitable HALS are Sanduvor 3058 and Tinuvin 292, with being Sanduvor 3058 most preferred.

Most preferably, the carbamate functional polymers of the invention will find utility in clearcoat compositions used in the production of composite coatings used in the automotive industry. Composite coatings are generally produced by the application of a basecoat composition to a bare, primed and/or electrocoated substrate, but preferably a primed and/or electrocoated substrate. The clearcoat is then applied to the basecoat. The basecoat may be cured or uncured but will preferably be in a substantially uncured state. Thus, the coating compositions of the invention are especially useful in producing wet-on-wet composite coatings.

Pigmented basecoat compositions for such composite coatings are well-known in the art, and do not require explanation in detail herein. Polymers known in the art to be useful in basecoat compositions include acrylics, vinyls, polyurethanes, polycarbonates, polyesters, alkyds, and polysiloxanes. Preferred polymers include acrylics and polyurethanes. In one preferred embodiment of the invention, the basecoat composition also utilizes a carbamate-functional acrylic polymer. Basecoat polymers are preferably crosslinkable, and thus comprise one or more type of cross-linkable functional groups. Such groups include, for example, hydroxy, isocyanate, amine, epoxy, acrylate, vinyl, silane, acetoacetate groups and mixtures thereof. These groups may be masked or blocked in such a way so that they are unblocked and available for the cross-linking reaction under the desired curing conditions, generally elevated temperatures. Useful cross-linkable functional groups include hydroxy, epoxy, acid, anhydride, silane, acetoacetate groups and mixtures thereof. Preferred cross-linkable functional groups include hydroxy functional groups, amino functional groups and mixtures thereof.

Basecoat polymers may be self-cross-linkable, or may require a separate cross-linking agent that is reactive with the functional groups of the polymer. When the polymer comprises hydroxy functional groups, for example, the cross-linking agent may be an aminoplast resin, isocyanate and blocked isocyanates (including isocyanurates), acid or anhydride functional cross-linking agents or and mixtures thereof.

The coating compositions of the invention can be applied to an article by any of a number of techniques well-known in the art. These include, for example, spray coating, dip coating, roll coating, curtain coating, and the like. For articles such as automotive body panels, spray coating is preferred. Articles which may coated with the compositions of the invention may be plastic, metal, wood, and mixtures thereof, with plastics and metal being preferred and metals such as steel, aluminum and the like being most preferred. Such substrates may be coated or uncoated, treated or untreated, and mixtures thereof. Most preferably, the articles or substrates to be coated with the compositions of the invention will be primed or electrocoated.

After an article is coated with one or more applications of the coating compositions of the invention, it is subjected to conditions so as to cure the applied coating layers. Although various methods of curing may be used, heat-curing is preferred. Generally, heat curing is effected by exposing the coated article to elevated temperatures provided primarily by radiative heat sources. Curing temperatures will vary depending on the particular blocking groups used in the cross-linking agents, however they generally range between 93° C. and 177° C., and are preferably between 121° C. and 141° C. The curing time will vary depending on the particular components used, and physical parameters such as the thickness of the layers, however, typical curing times range from 15 to 60 minutes.

The following examples are illustrative of the claimed invention but are not intended to limit the scope of the invention.

EXAMPLE 1 (B–F)

Example IB

Preparation of a Carbamate Functional Polymer (Resin IB) According to the Invention 690.9 parts of n-methyl pyrrolidone was heated to 120° C. under an inert atmosphere. Then a mixture of 912 parts of the cyclic carbonate of glycidyl methacrylate, 228 parts of styrene, 114 parts of 2,2'-azobis(2-methylbutanenitrile) and 150 parts of n-methyl pyrrolidone was added over 2 hours and 15 minutes. The reaction mixture was held at 120° C. for two hours then cooled to room temperature. Then 1400 parts of methanol was added and ammonia gas added to the reaction mixture until the reaction was complete. During this time, 30 parts of the reaction mixture was removed for sampling. The excess ammonia and methanol were then removed by vacuum distillation and 791.6 parts of ε caprolactone added. The reaction mixture was then heated under an inert atmosphere to 86° C. 3.4 parts of Fascat® 2003 (Elf Atochem) was subsequently added and the reaction mixture heated to 130° C. The reaction mixture was held at 130° C. until the reaction was complete. Then 287.9 parts of amyl acetate was added. The resulting resin had a NV of 65.0% and a % nonfunctional monomer of approximately 11%, based on the total weight of the polymer.

Example IC

Preparation of a Carbamate Functional Polymer (Resin IC) According to the Invention 690.9 parts of n-methyl pyrrolidone was heated to 120° C. under an inert atmosphere. A mixture of 912 parts of the cyclic carbonate of glycidyl methacrylate, 228 parts of n-butyl acrylate, 114 parts of 2,2'-azobis(2-methylbutanenitrile) and 150 parts of n-methyl pyrrolidone was then added over 2 hours and 45 minutes. The resulting reaction mixture was held at 120° C. for 1 hour and 40 minutes then cooled to room temperature. 1050 parts of methanol were then added and ammonia gas added to the reaction mixture until the reaction was complete. Excess ammonia and methanol were then removed by vacuum distillation and 791.6 parts of ε caprolactone added. The reaction mixture was then heated to 50° C. under an inert atmosphere. 3.44 parts of Fascat® 2003 was added and the reaction mixture heated to 130° C. The reaction mixture was held at 130° C. until the reaction was complete followed by the addition of 287.9 parts of amyl acetate. The resulting resin had a NV of 63.2% and a % nonfunctional monomer of approximately 11%, based on the total weight of the polymer.

Example ID

Preparation of a Carbamate Functional Polymer (Resin ID According to the Invention 794.5 parts of amyl acetate was heated to reflux under an inert atmosphere and then cooled to 130° C. A mixture of 618.8 parts of isocyanato ethyl methacrylate, 421.9 parts of butyl acrylate, 105.3 parts of styrene, and 137.5 parts of 2,2'-azobis(2-methylbutanenitrile) was then added to the reaction mixture over 2 hours and 5 minutes. The resulting reaction mixture was held at 130° C. for 1 hour and 50 minutes, then cooled to room temperature. 0.7 parts of dibutyl tin dilaurate was then charged into the reaction mixture and 414 parts of hydroxy propyl carbamate added slowly to the reaction mixture and allowed to react. 50 parts of isobutyl alcohol was then added followed by 396.7 parts of amyl acetate. The resulting resin had a NV of 58.65% and a % nonfictional monomer of approximately 31.2, based on the total weight of the polymer.

Example IE

Preparation of a Carbamate Functional Polymer (Resin IE) According to the Invention.

267.4 parts of xylene was heated to 140° C. under an inert atmosphere. A mixture of 235.8 parts of hydroxy ethyl methacrylate, 65.9 parts of styrene, 357 parts of glycidyl neodecanoate, 79 parts of xylene and 79 parts of 2,2'-azobis (2-methylbutanenitrile) was then added to the reaction mixture over 2 hours and 40 minutes. 3.3 parts of 2,2'-azobis (2-methylbutanenitrile) and 65.9 parts of xylene was then added over 1 hour. The mixture was cooled to 70° C. To 1126 parts of this reaction mixture was added 17.4 parts of glycidyl neodecanoate. The reaction mixture was heated to 77° C. and 176.7 parts of methyl carbamate, 5.26 parts of dibutyl tin dilaurate, and 406 parts of toluene were added. The reaction was heated to reflux for 13 hours. Once the reaction was complete, the solvent and excess unreacted materials were removed by vacuum stripping, followed by the addition of 250 parts of amyl acetate. The final resin had a NV of 72.7% and a % nonfunctional monomer of approximately 8.5%, based on the total weight of the polymer.

Comparative Example IF

Preparation of a Carbamate Functional Polymer (Resin IF) According to the Prior Art A mixture of 275.7 parts of xylene and 379.2 parts of methyl carbamate was heated under an inert atmosphere to between 136 and 138° C. A mixture of 506.2 parts of hydroxy ethyl methacrylate, 759.6 parts of styrene, 264.2 parts of xylene, 38 parts of octanethiol, and 151.9 parts of 2,2'-azobis(2-methylbutanenitrile) was added over 1 hour and 50 minutes. 25 parts of xylene was then added and the reaction mixture cooled to room temperature. Then 7.9 parts of dibutyl tin oxide and 300 parts of toluene were added and the reaction mixture heated to reflux. Once the reaction was complete, the solvent and excess unreacted materials were removed by vacuum stripping. Then 962 parts of amyl acetate was added. The final resin had a NV of 77.3% and a % nonfunctional monomer of approximately 49.5%, based on the total weight of the polymer.

EXAMPLE II (A–F)

Preparation of Clearcoat Coating Compositions According to the Invention (IIB–IIE) and the Prior Art (IIA & IIF)

Clearcoat compositions based on a carbamate functional resin, melamine, catalyst, a PBA flow agent, a HALS, two UVAs and a solvent were prepared. A carbamate functional acrylic control prepared according to the disclosures of U.S. Pat. No. 5,552,497, example 1, was used as Resin A for the preparation of comparative clearcoat coating composition IIA. Resins (IB)–(IF) were respectively used to prepare clearcoat coating compositions (IIB) through (IIF).

The melamine was Cymel® 323 from Cytec Industries and was used in an amount corresponding to a 1:1 carbamate:methoxy ratio. The catalyst was Nacure® XC-6206, commercially available from King Industries and used in an amount of 1.2% DDBSA based on total resin solids. The flow agent was 0.1% Lindron 22 PolyButyl Acrylate commecially available from Lindau Chemicals, based on total resin solids. The HALS was 1.5% Tinuvin® 123 HALS commercially available from Ciba Speciality Chemicals, and based on total resin solids. The two UVAs were 2.2% of Tinuvin® 928 Benzotriazole UVA and 0.9% of Tinuvin® 400 Triazine UVA, both based on the total resin solids and commercially available from Ciba Speciality Chemicals. The monomethyl ether of propylene glycol (Dowanol™ PM) was added such that the final compositions had a viscosity of 35 seconds on a #4 Ford Cup viscometer at 25° C.

EXAMPLE III

Repair Adhesion of Clearcoat Coating Compositions (IIA–IIF)

The repair adhesion of clearcoat coating compositions (IIA–IIF) was tested as follows. Test panels (IIIA–IIIF) were prepared by priming previously electrocoated cold rolled steel panels. The primer was applied to an approximately 1.0 mil dry film thickness and was a solventborne polyester/melamine based composition commercially available from BASF Corporation as U28AK215. The primer was then cured per recommended curing conditions. A waterborne black basecoat, commercially available from BASF Corporation as E202KW706, was then applied to the primed panel for a dry film build of from 0.6 to 0.7 mils and flashed for 5 minutes at 140 degrees F. Clearcoat compositions IIA, IIB, IIC, IID, IIE, and IIF were then spray applied to the flashed basecoated panels in a dry film build wedge of from 0.1 to 2.0 mils. The applied clearcoat compositions were then flashed for 20 minutes at room temperature. The panels were then cured for 90 minutes at 300 degrees F. to simulate an overbake condition. A repair condition was simulated by the application of the previously applied black waterborne basecoat to the overbaked clearcoated panels. No scuffy or abrasion was provided to the overbaked clearcoated panels. The 'repair' basecoat was applied as indicated above followed by application of the same corresponding clearcoat to the flashed but uncured basecoat. The clearcoat was applied to a dry film build of 2.0 mils. The clearcoat was the flashed for 20 minutes at room temperature and baked for 15 minutes at 260 degrees F.

Adhesion was evaluated per GM 9071P, hereby incorporated by reference. The results are set forth in Table 1.

TABLE 1

| Coating Composition | % Nonfunctional Monomer | % Adhesion Remaining |
| --- | --- | --- |
| IIA (Comparative) | 55.1% | 0% |
| IIB | 11% | 98% |
| IIC | 11% | 100% |
| IID | 31.2% | 95% |
| IIE | 8.5% | 90% |
| IIF (Comparative) | 49.5% | 10% |

It can thus be seen that coating compositions containing the carbamate functional resins of the invention exhibit improved repair adhesion relative to coating compositions containing prior art carbarmate functional resins.

EXAMPLE IV (A–E)

Preparation of Carbamate Functional Polymers Illustrating the effect of % Nonfunctional Monomer upon Repair Adhesion Example IVA Preparation of a Carbamate Functional Polymer (Resin IVA) According to the Invention 1973 parts of xylene, 1356.1 parts methyl carbamate and 2032 parts glycidyl neodecanoate were heated to 140° C. under an inert atmosphere. A mixture of 1718.4 parts of hydroxy ethyl methacrylate, 479.9 parts of styrene, 576 parts of acrylic acid, 552 parts of xylene and 576.1 parts of 2,2'-azobis(2-methylbutanenitrile) was added to the reaction mixture over 3.5 hours. The reaction mixture was slowly cooled to 110° C. 23.9 parts of 2,2'-azobis(2-methylbutanenitrile) and 200 parts of xylene were added over 1 hour. The reaction mixture was heated to 140° C. for 6.5 hours after which 28.3 parts of dibutyl tin oxide and 500 parts of toluene were added. The reaction was heated to reflux for 7.5 hours. Once the reaction was complete, the solvent and excess unreacted materials were removed by vacuum stripping, followed by the addition of 2186 parts of monomethyl ether of propylene glycol. The final resin had a NV of 69.59% and a % nonfunctional monomer of approximately 8.4%, based on the total weight of the polymer.

Example IVB

Preparation of a Carbamate Functional Polymer (Resin IVB) According to the Invention 689.5 parts of xylene, 473.9 parts methyl carbamate and 710.1 parts glycidyl neodecanoate were heated to 140° C. under an inert atmosphere. A mixture of 600 parts of hydroxy ethyl methacrylate, 167.7 parts of styrene, 240.7 parts of methacrylic acid, 192 parts of xylene and 206.3 parts of 2,2'-azobis(2-methylbutanenitrile) was added to the reaction mixture over 2.25 hours. The reaction mixture was slowly cooled to 115° C. 8.4 parts of 2,2'-azobis(2-methylbutanenitrile) and 69.9 parts of xylene were added over 1 hour. The reaction mixture was heated to 140° C. for 7 hours after which 9.9 parts of dibutyl tin oxide and 350 parts of toluene were added. The reaction was heated to reflux for 5.25 hours. Once the reaction was complete, the solvent and excess unreacted materials were removed by vacuum stripping, followed by the addition of 844.9 parts of monomethyl ether of propylene glycol. The final resin had a NV of 68.97% and a % nonfunctional monomer of approximately 8.1, based on the total weight of the polymer.

Example IVC

Preparation of a Carbamate Functional Polymer (Resin IVC) According to the Invention 731.6 parts of xylene, 445.4 parts methyl carbamate and 692.3 parts glycidyl neodecanoate were heated to 140° C. under an inert atmosphere. A mixture of 593.6 parts of hydroxy ethyl methacrylate, 163.6 parts of 2-ethylhexyl acrylate, 234.7 parts of methacrylic acid, 202.1 parts of xylene and 202.1 parts of 2,2'-azobis(2-methylbutanenitrile) was added to the reaction mixture over 2.25 hours. The reaction mixture was slowly cooled to 115° C. 33.7 parts of 2,2'-azobis(2-methylbutanenitrile) and 101 parts of xylene were added over 1 hour. The reaction mixture was heated to 140° C. for 5.75 hours after which 9.8 parts of dibutyl tin oxide and 300 parts of toluene were added. The reaction was heated to reflux for 6 hours. Once the reaction was complete, the solvent and excess unreacted materials were removed by vacuum stripping, followed by the addition of 797.5 parts of monomethyl ether of propylene glycol. The final resin had a NV of 67.78% and a % nonfunctional monomer of approximately 8.2, based on the total weight of the polymer.

Example IVD

Preparation of a Carbamate Functional Polymer (Resin IVD) According to the Invention 731.6 parts of xylene, 445.4 parts methyl carbamate and 542.6 parts glycidyl neodecanoate were heated to 140° C. under an inert atmosphere. A mixture of 593.6 parts of hydroxy ethyl methacrylate, 363.8 parts of 2-ethylhexyl acrylate, 184.1 parts of methacrylic acid, 202.1 parts of xylene and 202.1 parts of 2,2'-azobis(2-methylbutanenitrile) was added to the reaction mixture over 3.25 hours. The reaction mixture was slowly cooled to 115° C. 33.7 parts of 2,2'-azobis(2-methylbutanenitrile) and 101 parts of xylene were added over 1 hour. The reaction mixture was heated to 140° C. for 6 hours after which 9.8 parts of dibutyl tin oxide and 300 parts of toluene were added. The reaction was heated to reflux for 7.5 hours. Once the reaction was complete, the solvent and excess unreacted materials were removed by vacuum stripping, followed by the addition of 799.3 parts of monomethyl ether of propylene glycol. The final resin had a NV of 68.51% and a % nonfunctional monomer of approximately 18.2%, based on the total weight of the polymer.

Example IVE

Preparation of a Carbamate Functional Polymer (Resin IVE) According to the Invention 731.6 parts of xylene, 445.4 parts methyl carbamate and 393.2 parts glycidyl neodecanoate were heated to 140° C.

under an inert atmosphere. A mixture of 593.6 parts of hydroxy ethyl methacrylate, 564.1 parts of 2-ethylhexyl acrylate, 133.3 parts of methacrylic acid, 202.1 parts of xylene and 202.1 parts of 2,2'-azobis(2-methylbutanenitrile) was added to the reaction mixture over 3.25 hours. The reaction mixture was slowly cooled to 115° C. 33.7 parts of 2,2'-azobis(2-methylbutanenitrile) and 101 parts of xylene were added over 1 hour. The reaction mixture was heated to 140° C. for 6 hours after which 9.8 parts of dibutyl tin oxide and 300 parts of toluene were added. The reaction was heated to reflux for 4.75 hours. Once the reaction was complete, the solvent and excess unreacted materials were removed by vacuum stripping, followed by the addition of 804.9 parts of monomethyl ether of propylene glycol. The final resin had a NV of 68.87% and a % nonfunctional monomer of approximately 28.2%, based on the total weight of the polymer.

EXAMPLE V (A–F)

Preparation of Clearcoat Compositions Illustrating the Effect of % Nonfunctional Monomer upon Repair Adhesion Clearcoat compositions based on a carbamate functional resin, melamine, catalyst, a flow agent, a HALS, two UVAs and a solvent were prepared. A carbamate functional acrylic control prepared according to the disclosures of U.S. Pat. No. 5,552,497, example 1, was used as Resin F for the preparation of comparative clearcoat coating composition IVF. Resins (IB)–(IF) were respectively used to prepare clearcoat coating compositions (IIB) through (IIF).

The melamine was BM 9539, commercially available from Monsanto and was used in an amount corresponding to a 1:1 carbamate:methoxy ratio. The catalyst was Nacure® XC-6206, commercially available from King Industries and used in an amount of 1.2% DDBSA based on total resin solids. The flow agent was 0.1% Disparlon™ LC 955, commecially available from King Industries, and based on total resin solids. The HALS was 1.5% Sandovar 3056, commercially available from Clariant Industries, and based on total resin solids. The two UVAs were 2.2% of Tinuvin® 928 and 0.9% of Tinuvin® 400 Triazine UVA, both based on the total resin solids and commercially available from Ciba Speciality Chemicals. The solvent was propylene glycol methyl ether and was used in an amount sufficient to provide coating compositions having a 35 sec viscosity on a #4 Ford cup @ 80 degrees F.

EXAMPLE VI

Repair Adhesion of Clearcoat Coating Compositions (VA–VF)

The repair adhesion of clearcoat coating compositions (VA–VF) was tested as follows. Test panels (VIA–VIF) were prepared by priming previously electrocoated cold rolled steel panels. The primer was applied to an approximately 1.0 mil dry film thickness and was a solventborne polyester/melamine based composition commercially available from BASF Corporation as U28AK215. The primer was then cured per recommended curing conditions. A waterborne white basecoat, commercially available from BASF Corporation as E202WW709, was then applied to the primed panel for a dry film build of from 1.0 to 1.2 mils and flashed for 5 minutes at 140 degrees F. Clearcoat compositions VA, VB, VC, VD, VE, and VF were then spray applied to the flashed basecoated panels in a dry film build wedge of from 0.1 to 2.0 mils. The applied clearcoat compositions were then flashed for 20 minutes at room temperature. The panels were then cured for 90 minutes at 300 degrees F. to simulate an overbake condition. A repair condition was simulated by the application of the previously applied black waterborne basecoat to the overbaked clearcoated panels. No scuffy or abrasion was provided to the overbaked clearcoated panels. The 'repair' basecoat was applied as indicated above followed by application of the same corresponding clearcoat to the flashed but uncured basecoat. The clearcoat was applied to a dry film build of 2.0 mils. The clearcoat was the flashed for 20 minutes at room temperature and baked for 15 minutes at 260 degrees F.

Adhesion was evaluated per GM9071P, hereby incorporated by reference. The results are set forth in Table 2.

TABLE 2

| Coating Composition | % Nonfunctional Monomer | % Repair Adhesion Remaining |
|---|---|---|
| VA | 8.4% | 70% |
| VB | 8.1% | 65% |
| VC | 8.2% | 50% |
| VD | 18.2% | 30% |
| VE | 28.2% | 5% |
| VF (Comparative) | 55% | 0% |

It should be noted that "% repair adhesion remaining" identifies the amount of the second or repair basecoat/clearcoat composite composition which remains after the tape pull. The above results primarily illustrate the effect of % nonfunctional monomer upon repair adhesion. However, the loss of adhesion measured above for coating compositions VA, VB, VC, VD, and VE is always initiated at the nonexisitent portion of the underlying first clearcoat film build wedge, i.e., where the first applied clearcoat has a film build of approximately 0.0 mils. Thus, in these instances, the loss of adhesion is actually reflective of the degree of adhesion between the first applied basecoat and the second applied basecoat. In fact, coating compositions VA, VB, VC, and VD all showed 100% adhesion remaining at the recommended film build for the first underlying clearcoat composition. In contrast, comparative coating composition VF fails at all film builds of the first underlying clearcoat film build wedge. That is, none of the subsequently applied repair basecoat/clearcoat composite coating adhered to the first basecoat/clearcoat composite, regardless of the film build of the first clearcoat.

EXAMPLE VII

Evaluation of Clearcoat Adhesion to Primerless Urethane Windowshield Adhesive Caulking Clearcoat compositions VA and VF were evaluated for adhesion to two polyurethane adhesive calking compounds illustrative of those used by the automotive industry to adhere windowshield components to a painted car frame. The two compounds were Betaseal™ 15618 and Betaseal™ 15706, commercially available from Essex Corporation. Adhesion was evaluated per the test parameters of GM9522P, hereby incorporated by reference.

| | Betaseal 15618 | | Betaseal 15706 | |
|---|---|---|---|---|
| Clearcoat composition | Clearcoat Bake 15' @ 265 F. | Clearcoat Bake 90' @ 300 F. | Clearcoat Bake 15' @ 265 F. | Clearcoat Bake 90'@ 300 F. |
| VA | F, F | Fa, F | F, F | F, F |
| VF (Comparative) | Fa, Fa | Fa, Fa | Fa, Fa | Fa, Fa |

F = clearcoat to caulk adhesive failure;
Fa clearcoat to basecoat adhesive failure The results showed that in all instances where the control sample VF failed to adhere to the primerless polyurethane adhesive caulking, the clearcoat composition of the invention adhered to the caulking but only failed with respect to clearcoat/basecoat adhesion. Accordingly, the clearcoat compositions of the invention provide greatly improved adhesion to primer polyurethane adhesive caulking relative to that provided by carbamate clearcoats of the prior art.

EXAMPLE VIII

Another clearcoat composition was prepared using the carbamate functional resin of the invention of Example IVA. Clearcoat composition VIII was identical to that of the clearcoat composition of Example VIA except that no Disparlon™ 955 was used. This clearcoat composition was evaluated for scratch and mar against a control prior art clearcoat composition corresponding to clearcoat composition IIA.

Test panels were prepared as indicated in Examples III and VI except that no repair adhesion preparation was done. Two different basecoats were tested, a waterborne black basecoat commercially available from BASF Corporation as E202KW706, and medium solids solventborne black basecoat commercially available from BASF Coatings AG as VWL041 FD80-9103-0101 .

Scratch and mar was evaluated per FLTM BI 161-01, hereby incorporated by reference, using a CM-5 Crockmeter available from Atlas Electric Devices Co, Chicago Ill. The results are set forth below in Table 3.

TABLE 3

| | Clearcoat composition | |
|---|---|---|
| Basecoat | Control | Clearcoat VIII |
| Waterborne Black BC | 52.65 | 82.8 |
| Solventborne Black BC | 43.18 | 68.1 |

It can be seen that the clearcoat of the invention provides superior scratch and mar resistance as compared to the prior art carbamate clearcoat.

We claim:

1. A carbamate-functional polymer having a backbone made by addition polymerization, the polymer comprising from at least 66 to 100% by weight, based on the total weight of the carbamate-functional polymer, of one or more repeat units A selected from the group consisting of

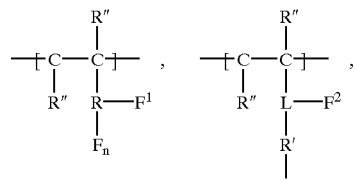

and mixtures thereof, and from 0 to less than 35% by weight, based on the total weight of the carbamate-functional polymer, of one or more repeat units A' having the structure

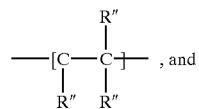, and the carbamate-functional polymer having an equivalent weight of at least 250 grams of polymer per carbamate group, wherein R is an at least divalent nonfunctional linking group having from 1 to 60 carbons atoms and from 0 to 20 heteroatoms selected from the group consisting of oxygen, nitrogen, sulfur, phosphorus, and silane, and mixtures thereof, R' is an at least monovalent nonfunctional linking group having from 1 to 60 carbons atoms and from 0 to 20 heteroatoms selected from the group consisting of oxygen, nitrogen, sulfur, phosphorus, and silane, and mixtures thereof, R" is H or a monovalent nonfunctional linking group having from 1 to 60 carbons atoms and from 0 to 20 heteroatoms selected from the group consisting of oxygen, nitrogen, sulfur, phosphorus, and silane, and mixtures thereof, L is a divalent nonfunctional linking group having from 1 to 60 carbons atoms and from 0 to 20 heteroatoms selected from the group consisting of oxygen, nitrogen, sulfur, phosphorus, and silane, and mixtures thereof, F, $F^1$ and $F^2$ are functional groups selected from the group consisting of primary carbamate groups, beta-hydroxy primary carbamate groups, hydroxyl groups, and mixtures thereof, with the proviso that at least one of $F^1$ and $F^2$ are a primary carbamate group or a beta-hydroxy primary carbamate group, and n is an integer from 0 to 3.

2. The polymer of claim 1 wherein the at least monovalent nonfunctional linking group R' comprises at least one branched alkyl group of a least 5 carbons.

3. The polymer of claim 2 wherein the at least one branched alkyl group has 10 carbons.

4. The polymer of claim 1 wherein R, R' or R" comprise one or more groups selected from the group consisting of esters, amides, secondary carbamates, ethers, secondary ureas, ketones, aliphatic groups, cycloaliphatic groups, aromatic groups, and mixtures thereof.

5. The polymer of claim 1 wherein R" is H.

6. The polymer of claim 1 comprising less than 20 percent by weight of repeat units A', based on the total weight of the carbamate-functional polymer.

7. The polymer of claim 1 comprising less than 10 percent by weight of one or more repeat units A', based on the total weight of the carbamate-functional polymer.

8. The polymer of claim 1 comprising from 1.0 to 9.0 percent by weight of one or more repeat units A', based on the total weight of the carbamate-functional polymer.

9. The polymer of claim 1 comprising less than 1 percent by weight of one or more repeat units A', based on the total weight of the carbamate-functional polymer.

10. The polymer of claim 1 wherein the equivalent weight is from 300 to 550 grams of polymer per primary carbamate group.

11. The polymer of claim 10 having an equivalent weight of from 350 to 450 grams of polymer per primary carbamate group.

12. The polymer of claim 1 wherein one or more of R, R', or R" are the reaction product of a functional group of a monomer A and a compound B having at least one functional group (b1) reactive with the functional group of monomer A.

13. The polymer of claim 12 wherein compound B further comprises an additional functional group selected from the group consisting of hydroxy groups, carbamate groups, groups convertible to hydroxy groups, and groups convertible to carbamate groups.

14. The polymer of claim 12 wherein one or more of R, R', or R" are the reaction product of an acrylic acid group and a glycidyl group containing monomer.

15. The polymer of claim 1 wherein

R is an alkyl ester group,

R' is a branched alkyl ester group of from 1 to 15 carbons,

R" is selected from the group consisting of hydrogen, aromatic groups, alkyl groups of from 1 to 10 carbons, and mixtures thereof, L is selected from the group consisting of

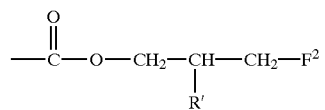

and isomers thereof,

F, $F^1$ and $F^2$ are selected from the group consisting of hydroxyl and primary carbamate, and n is 0.

16. The polymer of claim 15 wherein

R is

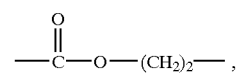

R' is

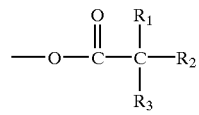

wherein $R_1$, $R_2$, and $R_3$ are alkyl groups of from 1 to 10 carbons.

17. The polymer of claim 15 wherein more than 50% of $F^1$ are primary carbamate groups and more than 50% of $F^2$ are hydroxyl groups.

* * * * *